(12) United States Patent
Takato

(10) Patent No.: US 11,265,433 B2
(45) Date of Patent: Mar. 1, 2022

(54) IMAGE FORMING APPARATUS AND CONTROL METHOD OF IMAGE FORMING APPARATUS

(71) Applicant: Toshiba Tec Kabushiki Kaisha, Tokyo (JP)

(72) Inventor: Jun Takato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/000,987

(22) Filed: Aug. 24, 2020

(65) Prior Publication Data
US 2021/0306487 A1 Sep. 30, 2021

(30) Foreign Application Priority Data

Mar. 25, 2020 (JP) .............. JP2020-053972

(51) Int. Cl.
H04N 1/00 (2006.01)

(52) U.S. Cl.
CPC ....... *H04N 1/00474* (2013.01); *H04N 1/0097* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 10,936,594 | B2* | 3/2021 | Beier | G06F 16/24553 |
| 2016/0277607 | A1* | 9/2016 | Tanaka | H04N 1/00474 |
| 2018/0288262 | A1 | 10/2018 | Yamada | |
| 2019/0289158 | A1* | 9/2019 | Inoue | G06F 9/4843 |

* cited by examiner

*Primary Examiner* — Frantz Bataille
(74) *Attorney, Agent, or Firm* — Foley & Lardner LLP

(57) ABSTRACT

An image forming apparatus includes a storage unit, an input unit, and an execution unit. The storage unit stores, for each application group, information indicating a range of values that can be set as parameters for executing a function. The input unit receives an input instructing execution of an application. When the application belonging to an application group executes a function, the execution unit executes the function with the parameters in the range.

19 Claims, 10 Drawing Sheets

FIG. 2

| Ta | | | | | |
|---|---|---|---|---|---|
| APPLICATION GROUP NAME | DOUBLE-SIDED/ SINGLE-SIDED MODE | PAGE AGGREGATION | SHEET FEED CASSETTE | COLOR MODE | IMAGE LOG |
| Copy | DOUBLE-SIDED ONLY | 2-16 | 1,2 | Black | ON |
| Scan | DOUBLE-SIDED/SINGLE-SIDED | 1-16 | NA | Black/Color | ON |
| Fax | DOUBLE-SIDED/SINGLE-SIDED | NA | NA | NA | ON |
| Print | DOUBLE-SIDED ONLY | 2-16 | All | Black/Color | OFF |

| APPLICATION NAME | DOUBLE-SIDED/ SINGLE-SIDED MODE | PAGE AGGREGATION | SHEET FEED CASSETTE | COLOR MODE | IMAGE LOG | APPLICATION TYPE |
|---|---|---|---|---|---|---|
| App1 | DOUBLE-SIDED/SINGLE-SIDED | 2-16 | 1,2 | Black | ON | Copy |
| App2 | DOUBLE-SIDED ONLY | NA | NA | NA | OFF | Print |
| App3 | DOUBLE-SIDED/SINGLE-SIDED | 1-16 | All | NA | ON | NONE |
| App4 | DOUBLE-SIDED ONLY | 2-16 | All | Black/Color | OFF | NONE |

FIG. 4

| USER NAME | DOUBLE-SIDED/ SINGLE-SIDED MODE | PAGE AGGREGATION | SHEET FEED CASSETTE | COLOR MODE | IMAGE LOG |
|---|---|---|---|---|---|
| User 1 | DOUBLE-SIDED/SINGLE-SIDED | 1-16 | All | Black | ON |
| User 2 | DOUBLE-SIDED/SINGLE-SIDED | 2-16 | 1,2,3 | Black/Color | ON |
| User 3 | DOUBLE-SIDED/SINGLE-SIDED | 1-16 | 1 | Black/Color | ON |
| User 4 | DOUBLE-SIDED ONLY | 2-16 | All | Black | ON |
| User 5 | DOUBLE-SIDED ONLY | 1-16 | All | Black/Color | OFF |

FIG. 5

| USER GROUP NAME | DOUBLE-SIDED/ SINGLE-SIDED MODE | PAGE AGGREGATION | SHEET FEED CASSETTE | COLOR MODE | IMAGE LOG |
|---|---|---|---|---|---|
| Group 1 | DOUBLE-SIDED ONLY | 2-16 | 1,2 | Black | ON |
| Group 2 | DOUBLE-SIDED ONLY | 1-16 | 1 | Black/Color | OFF |
| Group 3 | DOUBLE-SIDED/SINGLE-SIDED | 1-16 | All | Black/Color | OFF |
| Group 4 | DOUBLE-SIDED/SINGLE-SIDED | 1-16 | All | Black | ON |
| Group 5 | DOUBLE-SIDED/SINGLE-SIDED | 1-16 | 1,2,3 | Black | OFF |

Td

IMAGE FORMING APPARATUS AND CONTROL METHOD OF IMAGE FORMING APPARATUS

CROSS-REFERENCE TO RELATED APPLICATION

This application is based upon and claims the benefit of priority to Japanese Patent Application No. 2020-053972, filed Mar. 25, 2020, the entire contents of which are incorporated herein by reference.

FIELD

Embodiments described herein relate generally to an image forming apparatus and a control method of the image forming apparatus.

BACKGROUND

In an image forming apparatus in related art, when limiting a parameter that executes a function, the range of the parameter is limited for each function. However, there are image forming apparatuses capable of registering a plurality of similar applications. In such an image forming apparatus, it is desired to limit parameters in various categories, not limited for each function.

DESCRIPTION OF THE DRAWINGS

FIG. 2 is a diagram showing an example of an application group table included in a parameter DB according to the embodiment of FIG. 1;

FIG. 3 is a diagram showing an example of an application table included in the parameter DB according to the embodiment of FIG. 1;

FIG. 4 is a diagram showing an example of a user table included in the parameter DB according to the embodiment of FIG. 1;

FIG. 5 is a diagram showing an example of a user group table included in the parameter DB according to the embodiment of FIG. 1;

DETAILED DESCRIPTION

Figure 1:
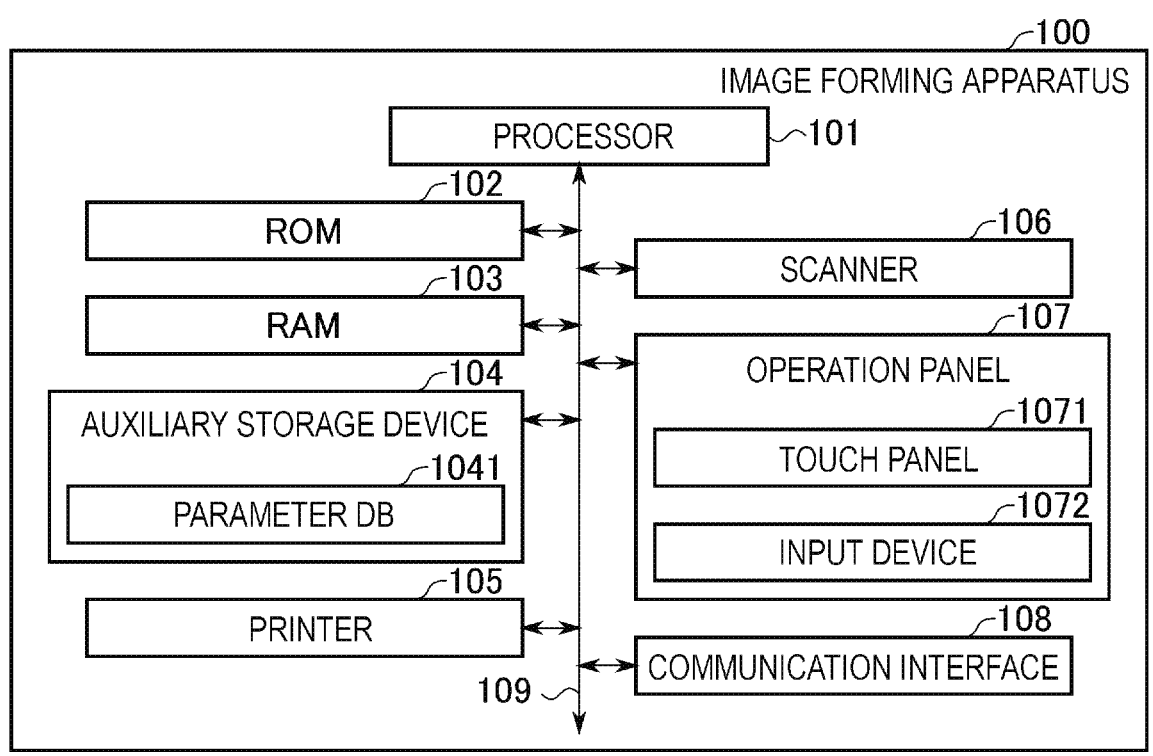
FIG. 1 is a block diagram showing an example of a main configuration of an image forming apparatus according to an embodiment.

The problem to be solved by embodiments of the present disclosure is to provide an image forming apparatus and a control method of an image forming apparatus, which can limit parameters in various categories.

In general, according to one embodiment, an image forming apparatus includes a storage unit, an input unit, and an execution unit. The storage unit stores, for each application group, information indicating a range of values that can be set as parameters for executing a function. The input unit receives an input instructing execution of an application. When the application belonging to an application group executes a function, the execution unit executes the function with the parameters in the range.

Hereinafter, an operation panel according to the embodiment will be described with reference to the drawings. In the drawings used for the description of the embodiments below, the scale of each part may be changed appropriately. Further, the drawings used for the description of the following embodiments may be illustrated with the configuration omitted for the sake of description. In the drawings and the present specification, the same reference numerals denote the same elements.

FIG. 1 is a block diagram showing an example of a main configuration of an image forming apparatus 100 according to the embodiment.

The image forming apparatus 100 is, for example, a multifunction peripheral (MFP), a copying machine, a printer, a facsimile, or the like. However, hereinafter, the image forming apparatus 100 will be described as an MFP. The image forming apparatus 100 has, for example, a print function, a scan function, a copy function, a facsimile function, and the like. The print function is a function of forming an image on an image forming medium P or the like with a recording material such as toner. The image forming medium P is, for example, a sheet of paper or the like. The scan function is a function of reading an image from a document or the like on which an image is formed. The copy function is a function of printing an image read from a document or the like using the scan function on the image forming medium P using the print function. The image forming apparatus 100 includes, for example, a processor 101, a read-only memory (ROM) 102, a random-access memory (RAM) 103, an auxiliary storage device 104, a printer 105, a scanner 106, an operation panel 107, and a communication interface 108. Then, a bus 109 or the like connects these units to each other.

The processor 101 corresponds to a central portion of a computer that performs processing such as calculation and control necessary for the operation of the image forming apparatus 100. The processor 101 controls each unit to realize various functions of the image forming apparatus 100 based on programs such as firmware, system software, and application software (application) stored in the ROM 102 or the auxiliary storage device 104. Further, the processor 101 executes processes described later based on the program. Apart or all of the program may be incorporated in the circuit of the processor 101. The processor 101 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD) or a field-programmable gate array (FPGA). Alternatively, the processor 101 is any combination of a plurality of the above.

The ROM 102 corresponds to a main storage device of a computer having the processor 101 as a center portion. The ROM 102 is a non-volatile memory used exclusively for reading data. The ROM 102 stores, for example, firmware among the above programs. The ROM 102 also stores data used by the processor 101 for performing various processes.

The RAM 103 corresponds to the main storage device of a computer having the processor 101 as a center portion. The RAM 103 is a memory used for reading and writing data. The RAM 103 is used as a work area for storing data temporarily used by the processor 101 for performing various processes. The RAM 103 is typically a volatile memory.

The auxiliary storage device 104 corresponds to an auxiliary storage device of a computer having the processor 101 as a center portion. The auxiliary storage device 104 is, for example, an electric erasable programmable read-only memory (EEPROM), a hard disk drive (HDD) (another form of memory), or a flash memory. The auxiliary storage device 104 stores, for example, system software and application software (application) among the above programs. In addition, the auxiliary storage device 104 stores data used by the processor 101 for performing various processes, data generated by the process of the processor 101, various setting values, and the like. The image forming apparatus 100 may include, as the auxiliary storage device 104, an interface into which a storage medium such as a memory card or a universal serial bus (USB) memory can be inserted. The interface reads and writes information from and to the storage medium.

The auxiliary storage device 104 stores a parameter DB (database) 1041.

The parameter DB 1041 manages and stores parameter limit information for each application, each application group, each user, and each user group. The parameter limit information is information indicating a range of parameters when the image forming apparatus 100 executes each function. The parameter DB 1041 stores, for example, four types of tables T including an application group table Ta, an application table Tb, a user table Tc, and a user group table Td.

FIG. 2 is a diagram showing an example of the application group table Ta. The application group table Ta is a table that stores parameter limit information for each application group with the application group as a category unit. Any number of applications belong to each application group. Any application may belong to each application group, but preferably, only common types of applications belong to each application group. For example, FIG. 2 shows four application groups including a Copy group, a Scan group, a Fax group, and a Print group. Each of the four application groups is a group including only common types of applications. The Copy group includes only applications that use the copy function. The Scan group includes only applications that use the scan function. The Fax group includes only applications that use the fax function. The Print group includes only applications that use the print function. There may be applications that do not belong to any application group.

The application group table Ta is an example of second information indicating a range of values that can be set as parameters for executing functions for each application group.

FIG. 3 is a diagram showing an example of the application table Tb. The application table Tb is a table that stores parameter limit information for each application with the application as a unit.

The application table Tb is an example of first information indicating a range of values that can be set as parameters for executing functions for each application.

FIG. 4 is a diagram showing an example of the user table Tc. The user table Tc is a table that stores parameter limit information for each user with the user as a category unit. The users can be classified into two types, registered users and non-registered users. The registered user indicates a user who has registered as a user in the image forming apparatus 100. An unregistered user indicates a user who is not a registered user. The user table Tc stores parameter limit information of each registered user and unregistered user. One user in the user table Tc is a non-registered user, and the other users are registered users. For example, in FIG. 4, User1 is a non-registered user, and User2 to User5 are registered users.

The user table Tc is an example of third information indicating a range of values that can be set as parameters for executing functions for each user.

FIG. 5 is a diagram showing an example of the user group table Td. The user group table Td is a table that stores parameter limit information for each user group with the user group as a category unit. Any number of users belongs to each user group. There may be users who do not belong to any user group.

The user group table Td is an example of fourth information indicating a range of values that can be set as parameters for executing functions for each user group.

Each table T stores a range of parameters for a plurality of types including, for example, five types of functions including "double-sided/single-sided mode", "page aggregation", "paper cassette", "color mode", and "image log" as parameter limit information for each category unit. The "double-sided/single-sided mode" function is a function related to double-sided printing and single-sided printing. When the value of the "double-sided/single-sided mode" function is "double-sided only", it indicates that the parameter is limited to double-sided printing only. If the value for the "double-sided/single-sided mode" function is "double-sided/single-sided", it indicates that the parameter is not limited. For other functions, there are values that limit the parameters and values that do not limit the parameters. If the value is "NA" regardless of the function, it means that the parameter is not limited.

The auxiliary storage device 104 also stores a priority table U.

Figures 6, 7:
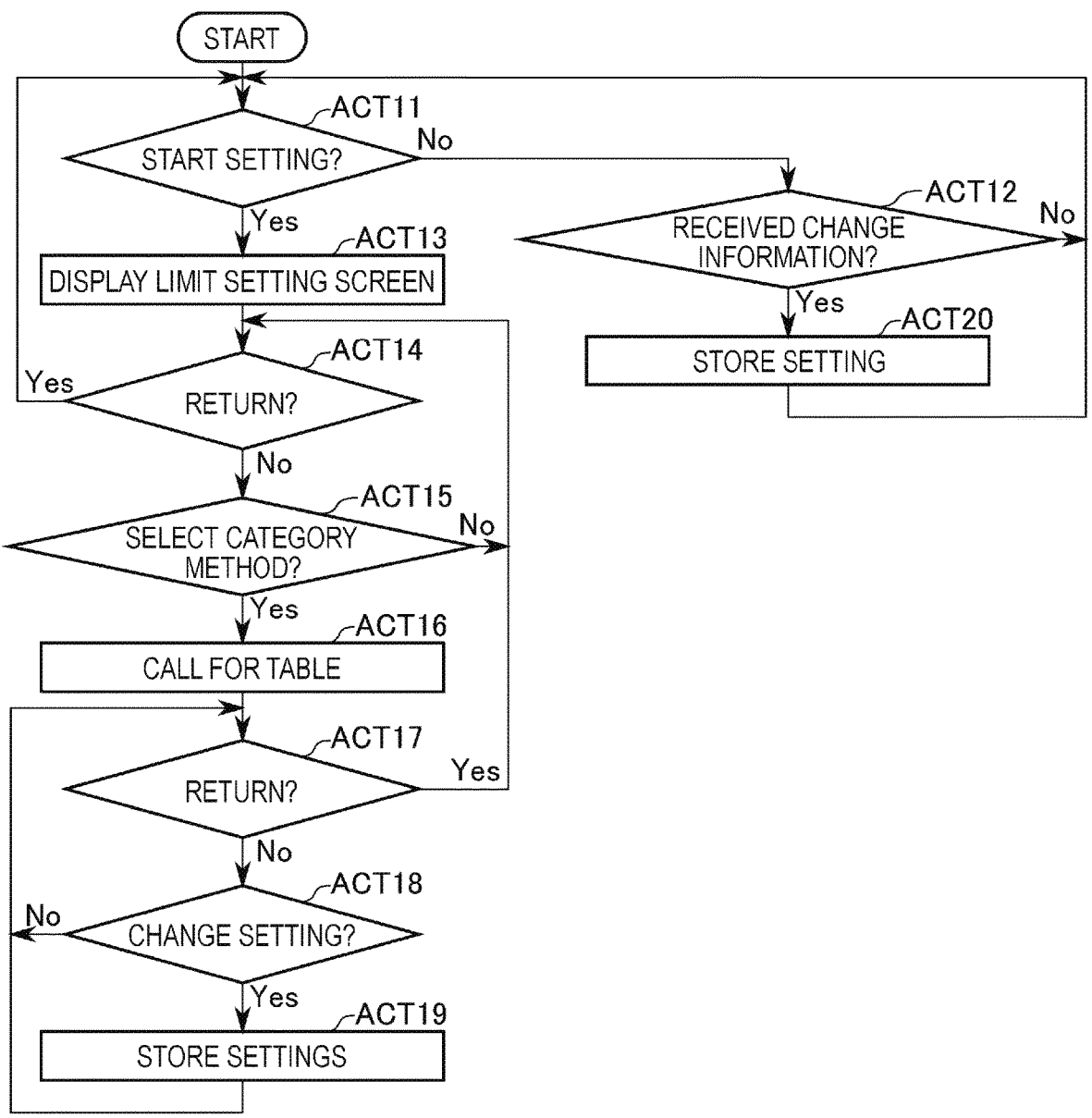
FIG. 6 is a diagram showing an example of a priority table included in the parameter DB according to the embodiment of FIG. 1.
FIG. 7 is a flowchart showing an example of a first process performed by a processor according to the embodiment of FIG. 1.

FIG. 6 is a diagram showing an example of the priority table U. The priority table U stores the priorities of four types of category methods of an application, an application group, a user, and a user group. The priorities shown in FIG. 6 use numbers 1 to 4, and the lower the number, the higher the priority. Therefore, a priority of 1 indicates the highest priority, and a priority of 4 indicates the lowest priority. From the above, the priority shown in FIG. 6 becomes the order of the application, the user, the user group, and the application group when the four category methods are arranged in order from the highest priority.

From the above, the auxiliary storage device 104 is an example of a storage unit that stores information indicating a range of values that can be set as parameters.

The printer 105 forms an image with toner or ink to print the image on the image forming medium P. The printer 105 includes, for example, an electrophotographic printer (laser), an inkjet printer, or another type of printer, and performs printing by the printer.

The scanner 106 reads an image from a document or the like. The scanner 106 is, for example, an optical reduction system including an image sensor such as a charge-coupled device (CCD) image sensor. Alternatively, the scanner 106 is a contact image sensor (CIS) system including an image sensor such as a complementary metal-oxide-semiconductor (CMOS) image sensor. Alternatively, the scanner 106 may be of another known type.

The operation panel 107 includes a man-machine interface that performs input and output between the image forming apparatus 100 and an operator of the image forming apparatus 100 (hereinafter, simply referred to as "operator"). The operation panel 107 includes, for example, buttons, a touch panel, and the like for an operator to operate. The touch panel is formed by stacking a display such as a liquid crystal display or an organic electro-luminescence (EL) display, and a pointing device by touch input. Therefore, the button and the touch panel function as an input device that receives an operation by the operator. Further, the display included in the touch panel functions as a display device that notifies the operator of various kinds of information. The operation panel 107 includes, for example, a touch panel 1071 and an input device 1072.

The touch panel 1071 is formed by stacking a display such as a liquid crystal display or an organic EL display, and a pointing device by touch input. The display included in the touch panel 1071 functions as a display device that displays a screen for notifying the operator of various kinds of information. The touch panel 1071 also functions as an input device that receives a touch operation performed by the operator.

The input device 1072 receives an operation by the operator of the image forming apparatus 100. The input device 1072 is, for example, a keyboard, a keypad, a touchpad, or the like.

The communication interface 108 is an interface for the image forming apparatus 100 to communicate via the Internet or a network such as a local area network (LAN).

The bus 109 includes a control bus, an address bus, a data bus, and the like, and transmits signals transmitted and received by each unit of the image forming apparatus 100.

Figure 8:
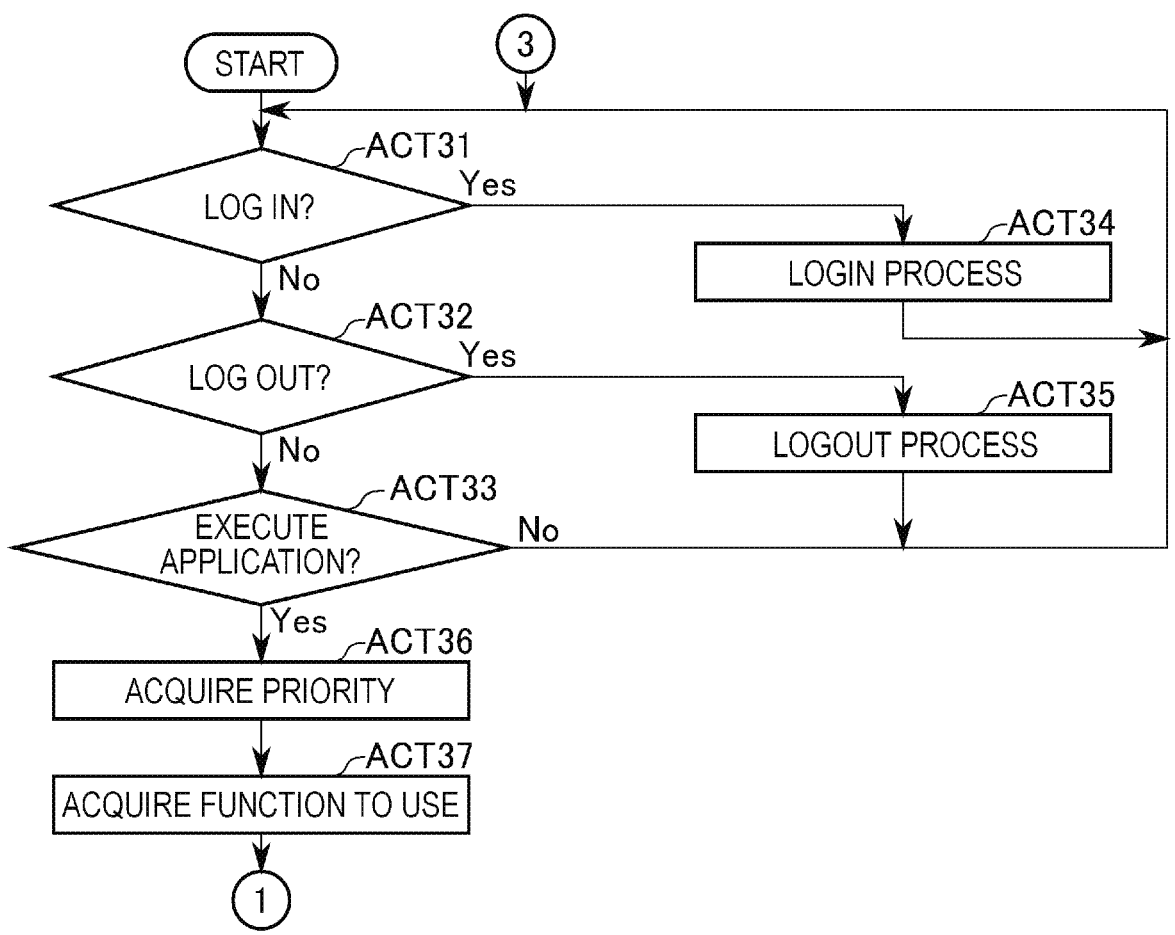
FIG. 8 is a flowchart showing an example of a second process performed by the processor according to the embodiment of FIG. 1.
Figure 9:
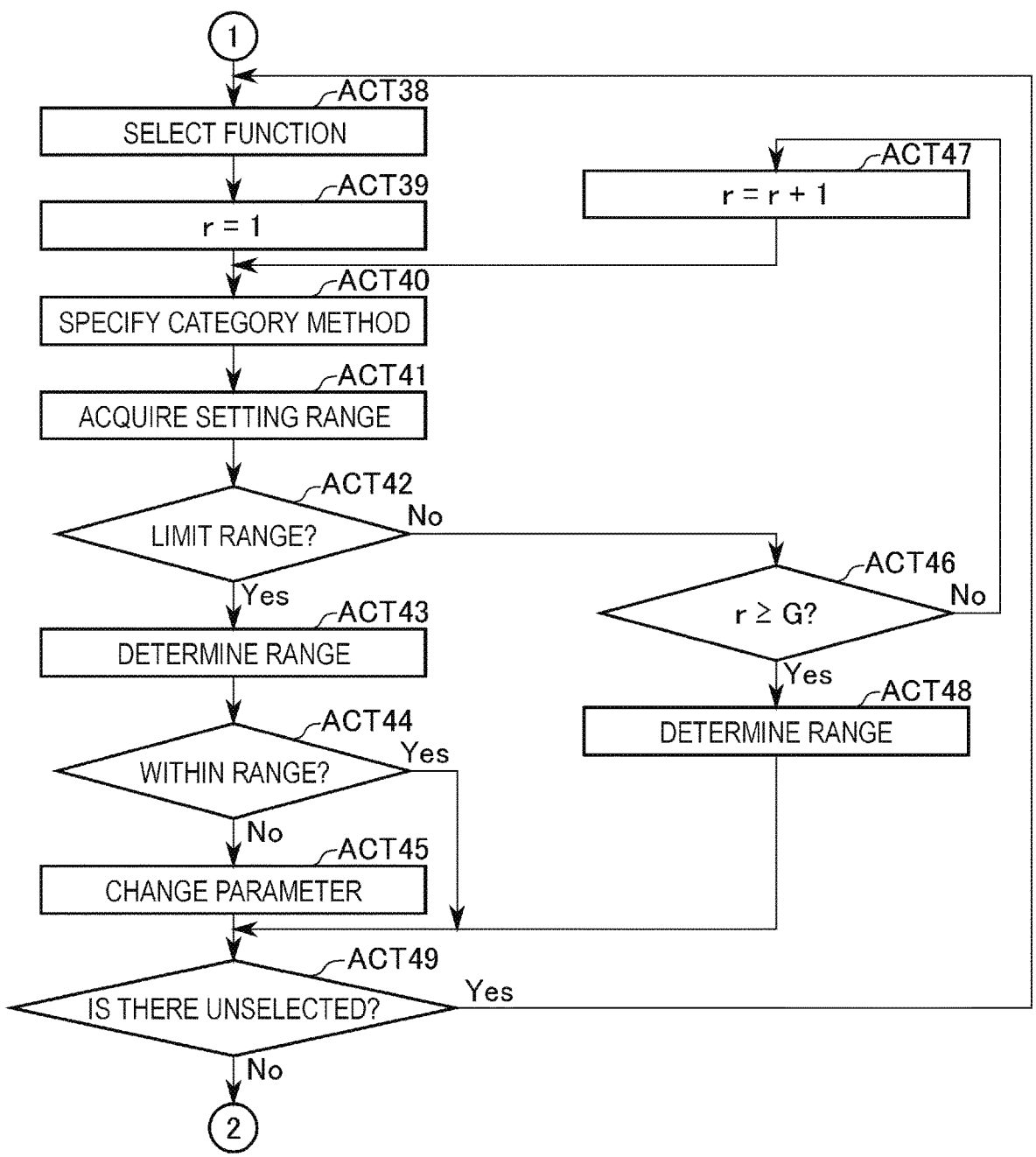
FIG. 9 is a flowchart showing an example of processes by the processor according to the embodiment of FIG. 1.
Figure 10:
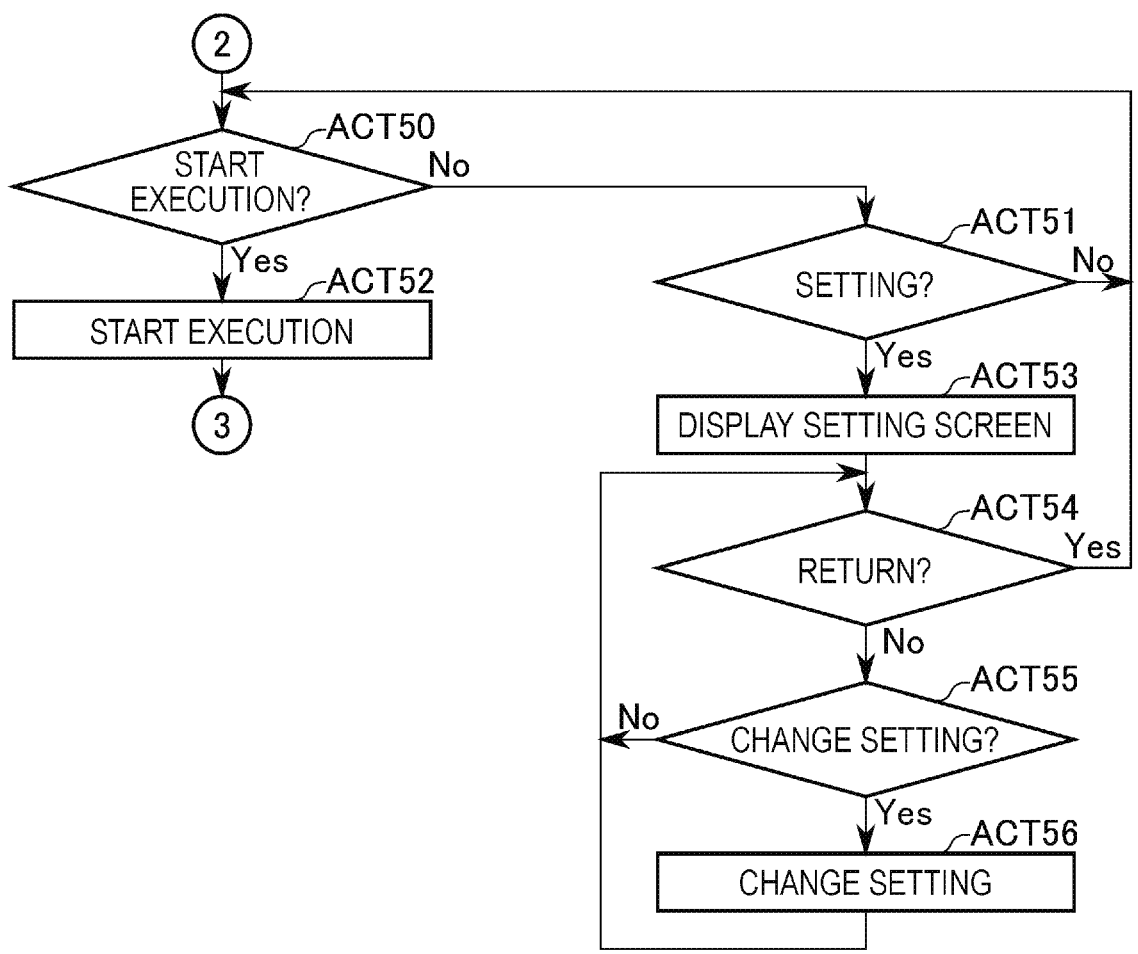
FIG. 10 is a flowchart showing an example of processes by the processor according to the embodiment of FIG. 1.

Hereinafter, the operation of the image forming apparatus 100 according to the embodiment will be described with reference to FIGS. 7 to 10. The content of the process in the following description of the operation is an example, and various processes that can obtain the same result can be appropriately used. FIGS. 7 and 8 are flowcharts showing an example of processes performed by the processor 101 of the image forming apparatus 100. The processor 101 executes the processes based on a program stored in the ROM 102 or the auxiliary storage device 104, for example. FIG. 7 is a flowchart regarding the setting change. FIGS. 8 to 10 are flowcharts regarding the execution of the function.

The processor 101 starts the processes shown in FIGS. 7 and 8 to 10, for example, when the image forming apparatus 100 is activated.

In ACT 11, the processor 101 determines whether or not an instruction to start the setting of the parameter limit information is input. Preferably, the image forming apparatus 100 is limited so that only a user having administrator authority can input an instruction to start the setting of the parameter limit information. If the instruction to start the setting of the parameter limit information is not input, the processor 101 determines No in ACT 11 and proceeds to ACT 12.

In ACT 12, the processor 101 determines whether the change information is received by the communication interface 108. The change information is information instructing to change the parameter limit information. The change information includes a category method, a category unit, a function, and a value. The change information is transmitted by, for example, a personal computer (PC), a server, a smartphone, or another image forming apparatus. If the change information is not received, the processor 101 determines No in ACT 12 and returns to ACT 11. Thus, the processor 101 is in a standby state in which ACT 11 and ACT 12 are repeated until an instruction to start the setting of the parameter limit information is input or the change information is received.

If the instruction to start the setting of the parameter limit information is input in the standby state of ACT 11 and ACT 12, the processor 101 determines YES in ACT 11 and proceeds to ACT 13.

In ACT 13, the processor 101 generates an image corresponding to a limit setting screen. Then, the processor 101 instructs the touch panel 1071 to display the generated image. Upon receiving the display instruction, the touch panel 1071 displays the limit setting screen.

The limit setting screen is a screen for setting parameter limit information.

In ACT 14, the processor 101 determines whether or not an operation of returning to the original screen after completing the setting of the parameter limit information is performed. If the operation of returning to the original screen after completing the setting of the parameter limit information is not performed, the processor 101 determines No in ACT 14 and proceeds to ACT 15.

In ACT 15, the processor 101 determines whether or not an operation of selecting a category method is performed. If the operation of selecting a category method is not performed, the processor 101 determines No in ACT 15 and returns to ACT 14. Thus, the processor 101 is in a standby state in which ACT 14 and ACT 15 are repeated until the operation of returning to the original screen after completing the setting of the parameter limit information or the operation of selecting a category method is performed.

If the operation of returning to the original screen after completing the setting of the parameter limit information is performed in the standby state of ACT 14 and ACT 15, the processor 101 determines Yes in ACT 14 and returns to ACT 11.

If the operation of selecting a target category method to change the parameter limit information is performed in the standby state of ACT 14 and ACT 15, the processor 101 determines Yes in ACT 15 and proceeds to ACT 16. The category method selected here is a target for setting parameter limit information.

In ACT 16, the processor 101 calls the table T corresponding to the selected category method from the parameter DB 1041. For example, if the selected category method is the application, the processor 101 calls the application table Tb.

In ACT 17, the processor 101 determines whether or not an operation of returning to the selection of the category method is performed. If the operation of returning to the selection of the category method is not performed, the processor 101 determines No in ACT 17 and proceeds to ACT 18.

In ACT 18, the processor 101 determines whether or not an instruction to change the parameter limit information is input. If the instruction to change the parameter limit information is not input, the processor 101 determines No in ACT 18 and returns to ACT 17. Thus, the processor 101 is in a standby state in which ACT 17 and ACT 18 are repeated until an operation of returning to the selection of the category method is performed or an instruction to change the parameter limit information is input.

If the operation of returning to the selection of the category method is performed in the standby state of ACT 17 and ACT 18, the processor 101 determines Yes in ACT 17 and returns to ACT 14.

If the instruction operation to change the parameter limit information is input in the standby state of ACT 17 and ACT 18, the processor 101 determines Yes in ACT 18 and proceeds to ACT 19. The instruction operation is an operation indicating the value of which function of which category unit is changed to what value.

In ACT 19, the processor 101 changes the value of the function indicated by the instruction operation in the category unit indicated by the instruction operation to the value indicated by the instruction operation in the table T called in ACT 16. After the processing of ACT 19, the processor 101 returns to ACT 17.

On the other hand, if the change information is received in the standby state of ACT 11 and ACT 12, the processor 101 determines Yes in ACT 12 and proceeds to ACT 20.

In ACT 20, the processor 101 calls the table T corresponding to the category method included in the change information received in ACT 12. Then, in the called table T, the processor 101 changes the value of the function included in the change information for each category unit included in the change information to the value included in the change information. After the processing of ACT 20, the processor 101 returns to ACT 11.

In ACT 31 of FIG. 8, the processor 101 determines whether or not a login operation is performed. The login operation is an operation for a registered user to log in to the image forming apparatus 100. An operator who wants to log in to the image forming apparatus 100 performs the following login operation, for example. That is, the operator operates the operation panel 107 or the like to input the user ID and password. Alternatively, the operator causes the card reader included in the image forming apparatus 100 to read the ID card possessed by the operator. The ID card stores information necessary for login such as the user ID. Alternatively, the operator may operate for logging in by biometric authentication. The image forming apparatus 100 may automatically perform biometric authentication when the operator approaches within a certain level. If the login operation is not performed, the processor 101 determines No in ACT 31 and proceeds to ACT 32.

In ACT 32, the processor 101 determines whether or not a logout operation is performed. The logout operation is an operation for a logged-in user to logout from the image forming apparatus 100. If the logout operation is not performed, the processor 101 determines No in ACT 32 and proceeds to ACT 33.

In ACT 33, the processor 101 determines whether to execute an application. The processor 101 determines to execute an application, for example, according to an execution operation by the operator using the operation panel 107. The execution operation is an operation of instructing the processor 101 to execute the application. The execution operation includes an operation that specifies which application is executed. Alternatively, the processor 101 determines to execute an application in response to the execution information received by the communication interface 108. The execution information is information instructing the processor 101 to execute the application. The execution information includes execution user information, execution application information, and execution parameter information. The execution user information is information indicating which user executes the application. The execution application information is information indicating which application is executed. The execution parameter information is information indicating what kind of parameter is used to execute the application. The execution information is transmitted by, for example, a PC, a server, a smartphone, or another image forming apparatus. As described above, the operation panel 107 or the communication interface 108 is an example of an input unit that receives an input instructing the execution of an application. If it is not determined to execute an application, the processor 101 determines No in ACT 33 and returns to ACT 31. Thus, the processor 101 is in a standby state in which ACT 31 to ACT 33 are repeated until the login operation or the logout operation is performed or an application is determined to be executed.

If the login operation is performed in the standby state of ACT 31 to ACT 33, the processor 101 determines Yes in ACT 31 and proceeds to ACT 34.

In ACT 34, the processor 101 performs authentication related to login. Then, if the authentication is successful, the processor 101 brings the image forming apparatus 100 into a state in which the registered user who performed the login operation in ACT 31 is logged in. For this reason, the processor 101 stores, for example, a user ID (identifier) in the RAM 103 or the like. The user ID is identification information uniquely given to each registered user. A state in which a registered user is logged in to the image forming apparatus 100 is referred to as a "login state". A state in which a registered user is not logged in to the image forming apparatus 100 is referred to as a "non-login state".

If the logout operation is performed in the standby state of ACT 31 to ACT 33, the processor 101 determines Yes in ACT 32 and proceeds to ACT 35.

In ACT 35, the processor 101 cancels the login state of the image forming apparatus 100 and brings the image forming apparatus 100 in the non-login state.

If it is determined to execute an application in the standby state of ACT 31 to ACT 33, the processor 101 determines Yes in ACT 33 and proceeds to ACT 36.

In ACT 36, the processor 101 acquires the priority of the category method from the priority table U.

In ACT 37, the processor 101 acquires the function information indicating the function used by the execution application from the execution application. The execution application is an application specified by the execution operation or the execution information. After the processing of ACT 37, the processor 101 proceeds to ACT 38 of FIG. 9.

In ACT 38 of FIG. 9, the processor 101 sets one of the unselected functions among the functions indicated by the function information acquired in ACT 37 of FIG. 8 to the selected state. All the functions indicated by the function information are all unselected at the stage when the function information is acquired in ACT 37. Then, the function in the selected state in ACT 37 is not unselected. The processor 101 performs the processing of ACT 38 after canceling the selected state of the function in the selected state when the function in the selected state is already present when performing the processing of ACT 38 of FIG. 9.

In ACT 39, the processor 101 sets the value of a variable r assigned to the RAM 103 or the like to 1.

In ACT 40, the processor 101 specifies a category method whose priority is r based on the priority acquired in ACT 36. For example, if r=1, the processor 101 specifies that the category method of priority 1 is the application. The category method specified here is hereinafter referred to as the "specified category".

In ACT 41, the processor 101 refers to the table T corresponding to the specified category and acquires the value indicating the parameter limit information when the execution application or the execution user uses the function in the selected state. The execution user is a user who executes the execution application.

If the specified category is an application group, the processor 101 refers to the application group table Ta and acquires the value of the function in the selected state of the application group to which the execution application belongs. However, if the execution application does not belong to any application group, the processor 101 acquires "NA" as the value.

If the specified category is the application, the processor 101 refers to the application table Tb and acquires the value of the function in the selected state of the execution application.

If the specified category is the user, the processor 101 refers to the user table Tc and acquires the value of the function in the selected state of the execution user.

If the specified category is the user group, the processor 101 refers to the user group table Td and acquires the value of the function in the selected state of the group to which the execution user belongs. However, if the execution user does not belong to any user group, the processor 101 acquires "NA" as the value.

In ACT 42, the processor 101 determines whether or not the value acquired in ACT 41 limits the parameter. If the acquired value limits the parameter, the processor 101 determines Yes in ACT 42 and proceeds to ACT 43.

In ACT 43, the processor 101 determines to limit the parameter range to the range indicated by the value acquired in ACT 41 for the function in the selected state. For this reason, the processor 101 stores the range in the RAM 103 or the like.

In ACT 44, the processor 101 determines whether or not the parameter is within the range stored in ACT 43 when the execution application uses the function in the selected state. When the execution application is executed based on the execution information, the parameter is the parameter indicated by the execution parameter information included in the execution information. When the execution application is executed based on the execution operation, the parameter is, for example, the parameter set as a default. If the parameter is out of the range stored in ACT 43 when the execution application uses the function in the selected state, the processor 101 determines No in ACT 44 and proceeds to ACT 45.

In ACT 45, the processor 101 changes the parameter to a value within the range stored in ACT 43 when the execution application uses the function in the selected state. When changing the parameter, the processor 101 preferably changes the parameter so that the difference between the parameter before the change and the parameter after the change is reduced as much as possible.

On the other hand, if the acquired value does not limit the parameter, the processor 101 determines No in ACT 42 and proceeds to ACT 46.

In ACT 46, the processor 101 determines whether or not the value of the variable r is a constant G or more. The constant G is the maximum value of priority available. Here, as shown in FIG. 6, since the priority is in the range of 1 to 4, G=4. If the value of the variable r is less than the constant G, the processor 101 determines No in ACT 46 and proceeds to ACT 47.

In ACT 47, the processor 101 increments the value of the variable r by 1. After the processing of ACT 47, the processor 101 returns to ACT 40.

On the other hand, if the value of the variable r is the constant G or more, the processor 101 determines Yes in ACT 46 and proceeds to ACT 48.

In ACT 48, the processor 101 determines not to limit the parameter range for the function in the selected state. For this reason, the processor 101 stores in the RAM 103 or the like that the range is not limited.

In this way, the processor 101 repeats ACT 40 to ACT 48 to determine whether or not the parameter range is limited for the functions in the selected state in order from the category method with the highest priority. Then, when the parameter range is limited, the processor 101 stores the range and exits from the repetition. That is, for the function in the selected state, the processor 101 determines the parameter range based on the category method having the highest priority when any of the category methods limits the parameter range.

On the other hand, if the parameter when the execution application uses the function in the selected state is within the range stored in ACT 43, the processor 101 determines Yes in ACT 44 and proceeds to ACT 49. Further, the processor 101 proceeds to ACT 49 after the processing of ACT 45 or ACT 48.

In ACT 49, the processor 101 determines whether or not there is an unselected function among the functions indicated by the function information acquired in ACT 37 of FIG. 8. If there is an unselected function, the processor 101 determines Yes in ACT 49 of FIG. 8 and returns to ACT 38.

As described above, the processor 101 repeats ACT 38 to ACT 49 to determine the parameter range for each function indicated by the function information acquired in ACT 37 of FIG. 8.

If there is not an unselected function, the processor 101 determines No in ACT 49 of FIG. 9 and proceeds to ACT 50 of FIG. 10.

In ACT 50 of FIG. 10, the processor 101 determines whether to start executing the execution application. For example, if the image forming apparatus 100 is set to automatically start executing the execution application, the processor 101 determines to start executing the execution application. Further, the processor 101 determines to start executing the execution application in response to an input of an instruction to execute the execution application such as operating a start button. If it is determined that the execution of the execution application is not started, automatically or otherwise, the processor 101 determines No in ACT 50 and proceeds to ACT 51.

In ACT 51, the processor 101 determines whether or not to set parameters for each function used by the execution application. The processor 101 determines to set the parameter, for example, in response to an input of an instruction to set the parameter. If it is not determined to set the parameters, the processor 101 determines No in ACT 51 and returns to ACT 50. Thus, the processor 101 is in a standby state in which ACT 50 and ACT 51 are repeated until it is determined to start executing the execution application or set the parameter.

If the processor 101 determines to start executing the execution application in the standby state of ACT 50 and ACT 51, the processor 101 determines Yes in ACT 50 and proceeds to ACT 52.

In ACT 52, the processor 101 starts executing the execution application. When the processor 101 executes the execution application based on the execution information, the parameter when using the function in the selected state is the parameter indicated by the execution parameter information included in the execution information. Then, when the processor 101 executes the execution application based on the execution operation, the parameter when using the function in the selected state is, for example, the parameter set to default. However, when the parameter is changed in ACT 45 of FIG. 9, ACT 56 of FIG. 10, or both, the processor 101 uses the latest changed parameter. After the processing of ACT 52, the processor 101 returns to ACT 31 of FIG. 8.

From the above, the processor 101 is an example of an execution unit that executes a function.

If it is determined to set the parameters in the standby state of ACT 50 and ACT 51, the processor 101 determines Yes in ACT 51 and proceeds to ACT 53.

In ACT 53, the processor 101 generates an image corresponding to the parameter setting screen. Then, the processor 101 instructs the touch panel 1071 to display the generated image. Upon receiving the display instruction, the touch panel 1071 displays a parameter setting screen.

Figure 11:
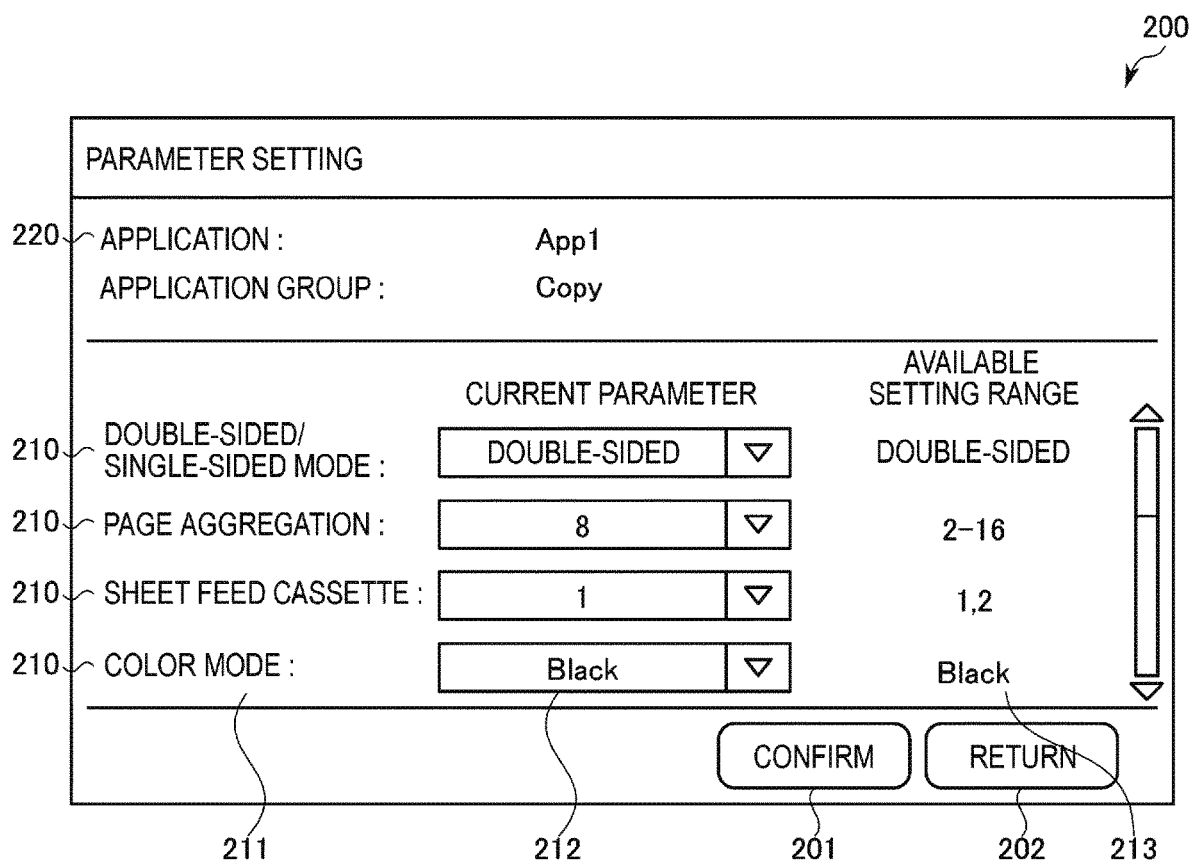
FIG. 11 is a diagram showing an example of a parameter setting screen displayed by a touch panel according to the embodiment of FIG. 1.

FIG. 11 is a diagram showing an example of a parameter setting screen 200 displayed on the touch panel 1071. The parameter setting screen 200 is a screen for setting parameters for each function used by the execution application. The parameter setting screen 200 includes, for example, a confirm button 201, a return button 202, a region 210, and a region 220.

The confirm button 201 is a button for an operator to operate when instructing the image forming apparatus 100 to change a parameter.

The return button 202 is a button for the operator to operate when ending the display of the parameter setting screen 200.

Each region 210 is a region including a display of information about each function used by the execution application. One region 210 corresponds to one function. Each region 210 includes regions 211 to 213.

The region 211 is a region for displaying the name of the corresponding function.

The region 212 is a region for displaying the current parameters of the corresponding function.

The region 213 is a region for displaying an available setting range for the corresponding function. The range is based on the information about the range stored in ACT 43 or ACT 48.

The operator can change the parameters within the range displayed in the region 213 by operating the region 212. The operator presses the confirm button 201 after operating the region 212. Thereby, the parameter changes are reflected.

The region 220 is a region for displaying information regarding the execution application.

From the above, the touch panel 1071 is an example of a display unit that displays the range of parameters.

In ACT 54, the processor 101 determines whether or not an operation of ending the display of the parameter setting screen 200 is performed. That is, the processor 101 determines whether or not a predetermined operation such as operating the return button 202 is performed. If the operation of ending the display of the parameter setting screen 200 is not performed, the processor 101 determines No in ACT 54 and proceeds to ACT 55.

In ACT 55, the processor 101 determines whether or not an input instructing the image forming apparatus 100 to change the parameter is performed. That is, the processor 101 determines whether or not a predetermined operation such as operating the confirm button 201 is performed. If the input instructing the image forming apparatus 100 to change the parameter is not performed, the processor 101 determines No in ACT 55 and returns to ACT 54. Thus, the processor 101 is in a standby state in which ACT 54 and ACT 55 are repeated until an operation of ending the display of the parameter setting screen 200 is performed or an input instructing the image forming apparatus 100 to change the parameter is performed.

If the operation of ending the display of the parameter setting screen 200 such as operating the return button 202 is performed in the standby state of ACT 54 and ACT 55, the processor 101 determines Yes in ACT 54 and returns to ACT 50.

If the input instructing the image forming apparatus 100 to change the parameter such as operating the confirm button 201 is performed in the standby state of ACT 54 and ACT 55, the processor 101 determines Yes in ACT 55 and proceeds to ACT 56.

In ACT 56, the processor 101 changes the parameter when the execution application uses the function to the value displayed in the region 212 based on the operation on the region 212. After the processing of ACT 56, the processor 101 returns to ACT 54.

The image forming apparatus 100 according to the embodiment determines the parameter range for each application. Therefore, the image forming apparatus 100 according to the embodiment can limit parameters in various categories.

The image forming apparatus 100 according to the embodiment determines the parameter range for each application group. Therefore, the image forming apparatus 100 according to the embodiment can limit parameters in various categories.

The image forming apparatus 100 according to the embodiment determines the parameter range for each user. Therefore, the image forming apparatus 100 according to the embodiment can limit parameters in various categories.

The image forming apparatus 100 according to the embodiment determines the parameter range for each user group. Therefore, the image forming apparatus 100 according to the embodiment can limit parameters in various categories.

The image forming apparatus 100 according to the embodiment determines the parameter range in a plurality of categories such as each application, each application group, each user, and each user group. Therefore, the image forming apparatus 100 according to the embodiment can limit parameters in various categories.

The image forming apparatus 100 according to the embodiment displays a range of available setting parameters. Thereby, the operator can easily understand the range of parameters that can be set by looking at the display.

The above embodiment can be modified as follows.

In the above embodiment, the image forming apparatus 100 displays the parameter setting screen on the touch panel 1071. However, the image forming apparatus 100 may display the parameter setting screen on a PC, a server, a smartphone, or the like via the network. In this case, the PC, the server, or the smartphone transmits the changed contents of the parameter based on the operation performed using the parameter setting screen, to the image forming apparatus 100. Then, the image forming apparatus changes the parameter based on the changed contents.

Each table T stores the parameter limit information for each application, each application group, each user, or each user group so that the parameter limit information can be specified by the name of the application, the application group, the user, or the user group. However, each table T may be stored so that the parameter limit information can be specified by using the ID instead of the name.

The PC, the server, or the smartphone may display the limit setting screen. In this case, the PC, server, or smartphone stores the parameter DB 1041. Then, the PC, the server, or the smartphone transmits the changed contents of the parameter limit information to the image forming apparatus 100 when the instruction to change the parameter limit information is input. The image forming apparatus 100 that received the changed contents changes the value of each table T based on the changed contents. The PC, the server, or the smartphone may transmit the changed contents to a plurality of image forming apparatuses 100. Thereby, the PC, the server, or the smartphone can change the parameter limit information for the plurality of image forming apparatuses 100 at once.

The processor 101 may realize a part or all of the processes realized by the program in the above embodiment by a hardware configuration of a circuit.

The image forming apparatus 100 according to the above embodiment is handed over to an administrator or the like in a state where a program for executing each of the above processes is stored. Alternatively, the image forming apparatus 100 is handed over to an administrator or the like in a state where the program is not stored. Then, the program is separately transferred to the administrator or the like and stored in the image forming apparatus 100 based on an operation by the administrator or a service person. The transfer of the program at this time can be realized, for example, by using a removable storage medium such as a disk medium or a semiconductor memory, or by downloading via the Internet or LAN.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a memory configured to store information for one or more parameters, each parameter having an associated range of values from which the parameter can be set, for executing at least one function for an application group;
   an input device configured to receive an input including an instruction to execute an application;
   a processor configured to execute the at least one function using the one or more parameters when the application indicated by the instruction belongs to the application group; and
   a display configured to display a range of the one or more parameters of the function executed by the application adjacent in a region where a parameter to be set are displayed.

2. The apparatus according to claim 1, wherein the input device is at least one of a communication interface configured to receive an input operation through a network or a user display interface.

3. The apparatus according to claim 1, wherein the at least one function comprises:
   a print function configured to form an image on a medium;
   a scan function configured to read an image from a medium on which the image is formed; or
   a copy function configured to print an image read from a medium using the scan function.

4. The apparatus according to claim 1, wherein upon determining the parameter has a first value out of the range of values for executing the at least one function by the application group to which the application belongs, the processor is further configured to update the first value to a second value within the range while minimizing a difference between the first value and second value.

5. An image forming apparatus comprising:
   a memory configured to store one or more pieces of information and a priority associated with each of the one or more pieces of information, the one or more pieces of information including:
      first information indicating a first set of parameters, each parameter having an associated first range of values from which the parameter can be set, for executing functions for an application, the first information having a first priority number associated with a priority of the first information,
      second information indicating a second set of parameters, each parameter having an associated second range of values from which the parameter can be set, for executing functions for an application group, the second information having a second priority number associated with a priority of the second information,
      third information indicating a third set of parameters, each parameter having an associated third range of values from which the parameter can be set, for executing functions for a user, the third information having a third priority number associated with a priority of the third information, and
      fourth information indicating a fourth set of parameters, each parameter having an associated fourth range of values from which the parameter can be set, for executing functions for a user group, the fourth information having a fourth priority number associated with a priority of the fourth information;
   an input device configured to receive an input including an instruction to execute an application; and
   a processor configured to execute, as part of executing the application, the functions using a range of values for the one or more parameters indicated by a piece of information limiting the range and having a highest priority, based on the first priority number, the second priority number, the third priority number, and the fourth priority number, among the one or more pieces of information limiting the range, when at least one of the one or more pieces of information limits any of the first range, the second range, the third range or the fourth range.

6. The apparatus according to claim 1, further comprising:
   a display configured to display a range of parameters of the function executed by the application.

7. The apparatus according to claim 1, wherein the input device is at least one of a communication interface configured to receive an input operation through a network or a user interface.

8. The apparatus according to claim 1, wherein the functions comprise:
   a print function configured to form an image on a medium;
   a scan function configured to read an image from a medium on which the image is formed; or
   a copy function configured to print an image read from a medium using the scan function.

9. The apparatus according to claim 1, wherein, upon determining that the one or more parameters has a first value out of the range of values for executing the functions, the processor is further configured to update the first value to a second value within the range while minimizing a difference between the first value and second value.

10. A control method of an image forming apparatus comprising:
storing information for one or more parameters, each parameter having an associated range of values from which the parameter can be set, for executing at least one function for an application group, and
receiving an input including an instruction to execute an application; and
executing the at least one function using the one or more parameters when the application indicated by the instruction belongs to the application group executing the function.

11. The method according to claim 10, further comprising displaying a range of the one or more parameters of the function executed by the application.

12. The method according to claim 10, wherein receiving the input occurs at one of a communication interface for receiving the input from a network or a user interface for receiving the input from a user.

13. The method according to claim 10, wherein the at least one function comprises:
a print function, in which an image is formed on a medium;
a scan function, in which an image is read from a medium on which the image is formed; or
a copy function configured to print an image read from a medium using the scan function.

14. The method according to claim 10, wherein, upon determining that the one or more parameters has a first value out of the range of values for executing the at least one function by the application group to which the application belongs, the method further includes updating the first value to a second value within the range while minimizing a difference between the first value and second value.

15. A control method of an image forming apparatus comprising:
storing one or more pieces of information including
first information indicating a first set of parameters, each parameter having an associated first range of values from which the parameter can be set, for executing functions for an application, the first information having a first priority number associated with a priority of the first information,
second information indicating a second set of parameters, each parameter having an associated second range of values from which the parameter can be set, for executing functions for an application group, the second information having a second priority number associated with a priority of the second information,
third information indicating a third set of parameters, each parameter having an associated third range of values from which the parameter can be set, for executing functions for a user, the third information having a third priority number associated with a priority of the third information, and
fourth information indicating a fourth set of parameters, each parameter associated with a fourth range of values from which the parameter can be set, for executing functions for a user group, the fourth information having a fourth priority number associated with a priority of the fourth information;
receiving an input including an instruction to execute an application; and
executing, as part of executing the application, the functions using a range of values for the one or more parameters indicated by a piece of information limiting the range and having a highest priority, based on the first priority number, the second priority number, the third priority number, and the fourth priority number, among the one or more pieces of information limiting the range, when at least one of the one or more pieces of information limits any of the first range, the second range, the third range, or the fourth range.

16. The method according to claim 15, further comprising displaying a range of the one or more parameters of the function executed by the application.

17. The method according to claim 15, wherein receiving the input occurs at one of a communication interface for receiving the input from a network or a user interface.

18. The method according to claim 15, wherein the functions comprise:
a print function, in which an image is formed on a medium;
a scan function, in which an image is read from a medium on which the image is formed; or
a copy function configured to print an image read from a medium using the scan function.

19. The method according to claim 15, wherein, upon determining that the one or more parameters has a first value out of the range of values for executing the functions, the method further includes updating the first value to a second value within the range while minimizing a difference between the first value and second value.

* * * * *